United States Patent
Verma et al.

(10) Patent No.: US 10,771,488 B2
(45) Date of Patent: Sep. 8, 2020

(54) SPATIO-TEMPORAL ANOMALY DETECTION IN COMPUTER NETWORKS USING GRAPH CONVOLUTIONAL RECURRENT NEURAL NETWORKS (GCRNNS)

(71) Applicant: Cisco Technology, Inc., San Jose, CA (US)

(72) Inventors: Saurabh Verma, Minneapolis, MN (US); Manjula Shivanna, San Jose, CA (US); Gyana Ranjan Dash, San Jose, CA (US); Antonio Nucci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 15/949,198

(22) Filed: Apr. 10, 2018

(65) Prior Publication Data

US 2019/0312898 A1 Oct. 10, 2019

(51) Int. Cl.
*H04L 29/06* (2006.01)
*G06N 3/08* (2006.01)

(52) U.S. Cl.
CPC .......... *H04L 63/1425* (2013.01); *G06N 3/08* (2013.01); *H04L 63/1416* (2013.01)

(58) Field of Classification Search
CPC .... H04L 63/1425; H04L 63/1416; G06N 3/08
See application file for complete search history.

(56) References Cited

U.S. PATENT DOCUMENTS

| | | | |
|---|---|---|---|
| 9,721,097 B1* | 8/2017 | Davis | G06F 21/562 |
| 10,425,434 B2* | 9/2019 | Kohout | H04L 63/1408 |
| 2016/0203036 A1 | 7/2016 | Mezic et al. | |
| 2016/0219066 A1* | 7/2016 | Vasseur | H04L 63/1425 |
| 2016/0299938 A1* | 10/2016 | Malhotra | G06F 16/2237 |
| 2016/0350532 A1* | 12/2016 | Davis | G06F 21/564 |
| 2017/0206464 A1 | 7/2017 | Clayton et al. | |
| 2017/0279828 A1* | 9/2017 | Savalle | H04L 41/142 |
| 2017/0310691 A1* | 10/2017 | Vasseur | H04L 63/1458 |

(Continued)

OTHER PUBLICATIONS

Ahmad, et al., "Real-Time Anomaly Detection for Streaming Analytics", arXiv:1607.02480v1, Jul. 8, 2016, 10 pages, arXiv.org.

(Continued)

*Primary Examiner* — Joseph P Hirl
*Assistant Examiner* — Stephen T Gundry
(74) *Attorney, Agent, or Firm* — Behmke Innovation Group LLC; Kenneth J. Heywood; Jonathon P. Western

(57) ABSTRACT

In one embodiment, a device receives sensor data from a plurality of nodes in a computer network. The device uses the sensor data and a graph that represents a topology of the nodes in the network as input to a graph convolutional neural network. The device provides an output of the graph convolutional neural network as input to a convolutional long short-term memory recurrent neural network. The device detects an anomaly in the computer network by comparing a reconstruction error associated with an output of the convolutional long short-term memory recurrent neural network to a defined threshold. The device initiates a mitigation action in the computer network for the detected anomaly.

17 Claims, 6 Drawing Sheets

(56) References Cited

U.S. PATENT DOCUMENTS

| | | | |
|---|---|---|---|
| 2018/0077182 A1* | 3/2018 | Sartran | H04L 41/16 |
| 2018/0278487 A1* | 9/2018 | Mermoud | H04L 41/16 |
| 2018/0367428 A1* | 12/2018 | Di Pietro | H04L 63/1408 |
| 2019/0014134 A1* | 1/2019 | Kopp | G06N 20/20 |
| 2019/0043351 A1* | 2/2019 | Yang | G06F 21/6245 |
| 2019/0045207 A1* | 2/2019 | Chen | G06K 9/72 |
| 2019/0089599 A1* | 3/2019 | Savalle | H04L 67/34 |
| 2019/0114245 A1* | 4/2019 | Mermoud | G06F 11/3409 |
| 2019/0138938 A1* | 5/2019 | Vasseur | H04L 43/0888 |
| 2019/0207822 A1* | 7/2019 | Di Pietro | H04L 41/145 |
| 2019/0239100 A1* | 8/2019 | Pandey | H04W 36/08 |
| 2019/0253328 A1* | 8/2019 | Kolar | H04L 43/045 |
| 2019/0286506 A1* | 9/2019 | Cheng | G06N 3/0445 |
| 2019/0297108 A1* | 9/2019 | Johnston | H04L 63/20 |
| 2019/0306011 A1* | 10/2019 | Fenoglio | H04L 41/22 |
| 2020/0022016 A1* | 1/2020 | Fenoglio | H04L 41/16 |

OTHER PUBLICATIONS

Bin et al., "Research on data mining models for the internet of things", 2010 International Conference on Image Analysis and Signal Processing (IASP), pp. 127-132, 2010, IEEE.

Cheng, et al., "Deep Convolutional Neural Networks for Anomaly Event Classification on Distributed Systems", arXiv:1710.09052, 2017, arXiv.org.

Hodo, et al., "Threat analysis of IoT networks Using Artificial Neural Network Intrusion Detection System", Computers and Communications (ISNCC), 2016 International Symposium on Networks, 5 pages, 2016, IEEE.

Hsu, Daniel., "Anomaly Detection Report", arXiv:1708.02975v2, 12 pages, Nov. 1, 2017, arXiv.org.

Putchala, Manoj Kumar., "Deep Learning Approach for Intrusion Detection System (IDS) in the Internet of Things (IOT) Network Using Gated Recurrent Neural Networks (GRU)", Thesis, 63 pages, 2017, Wright State University.

Medel, Jefferson Ryan., "Anomaly Detection Using Predictive Convolutional Long Short-Term Memory Units", Thesis, 84 pages, 2016, Accessed from Rochester Institute of Technology.

Raza, et al., "SVELTE: Real-time intrusion detection in the Internet of Things", Ad Hoc Networks, vol. 11, Issue 8, Nov. 2013, pp. 2661-2674, Elsevier B.V.

Seo, et al., "Structured sequence modeling with graph convolutional recurrent networks", arXiv:1612.07659v1, Dec. 22, 2016, 10 pages, arXiv.org.

Silipo, et al., "Anomaly Detection and Predictive Maintenance", 66 pages, 2015, KNIME.com AG.

Shi et al., "Convolutional LSTM Network: A Machine Learning Approach for Precipitation Nowcasting", arXiv:1506.04214v2, Sep. 19, 2015, 12 pages, arXiv.org.

Stiawan, et al., "Anomaly detection and monitoring in Internet of Things communication", 2016 8th International Conference on Information Technology and Electrical Engineering (ICITEE), pp. 1-4, 2016, IEEE.

Xie, et al., "Anomaly Detection and Redundancy Elimination of Big Sensor Data in Internet of Things", arXiv:1703.03225v1, Mar. 9, 2017, 22 pages, arXiv.org.

"Anomaly detection with event data in the internet of things.", https://www.bosch-si.com/iot-platform/insights/downloads/white-paper-iot-analytics.html, 1 page, 2016, Bosch Software Innovations GmbH.

"Network Security Analytics", https://www.extrahop.com/solutions/initiative/security/, 6 pages, Accessed on Jan. 8, 2018, ExtraHop Networks.

http://colah.github.io/posts/2015-08-Understanding-LSTMs/; Understanding LSTM Networks; Aug. 27, 2015; pp. 1-10.

Kipf, Thomas "https://tkipf.github.io/graph-convolutional-networks/"; Graph Convolutional Networks; Sep. 30, 2016; pp. 1-8.

Sainath et al. "Convolutional, Long Short-Term Memory, Fully Connected Deep Neural Networks" Google, Inc., New York; pp. 1-5.

Niepert et al. "Learning Convolutional Neural Networks for Graphs" NEC Labs Europe, Heidelberg, Germany; Jun. 8, 2016; pp. 1-10.

* cited by examiner

SPATIO-TEMPORAL ANOMALY DETECTION IN COMPUTER NETWORKS USING GRAPH CONVOLUTIONAL RECURRENT NEURAL NETWORKS (GCRNNS)

TECHNICAL FIELD

The present disclosure relates generally to computer networks, and, more particularly, to performing spatio-temporal anomaly detection in a computer network using graph convolutional recurrent neural networks (GCNNs).

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

One type of network attack that is of particular concern in the context of computer networks, such as IoT networks, is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
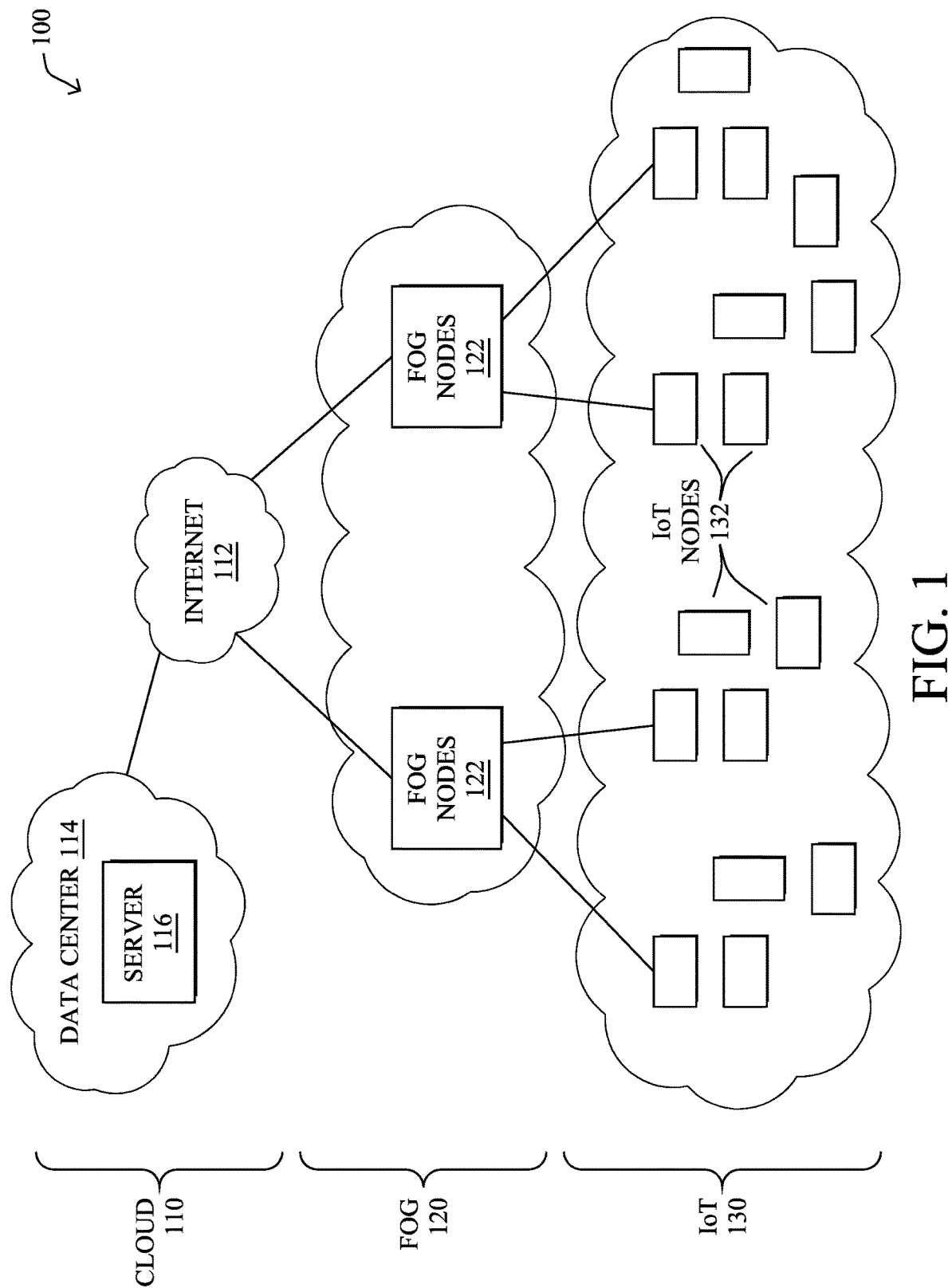
FIG. 1 illustrates an example computer network.

According to one or more embodiments of the disclosure, a device receives sensor data from a plurality of nodes in a computer network. The device uses the sensor data and a graph that represents a topology of the nodes in the network as input to a graph convolutional neural network. The device provides an output of the graph convolutional neural network as input to a convolutional long short-term memory recurrent neural network. The device detects an anomaly in the computer network by comparing a reconstruction error associated with an output of the convolutional long short-term memory recurrent neural network to a defined threshold. The device initiates a mitigation action in the computer network for the detected anomaly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
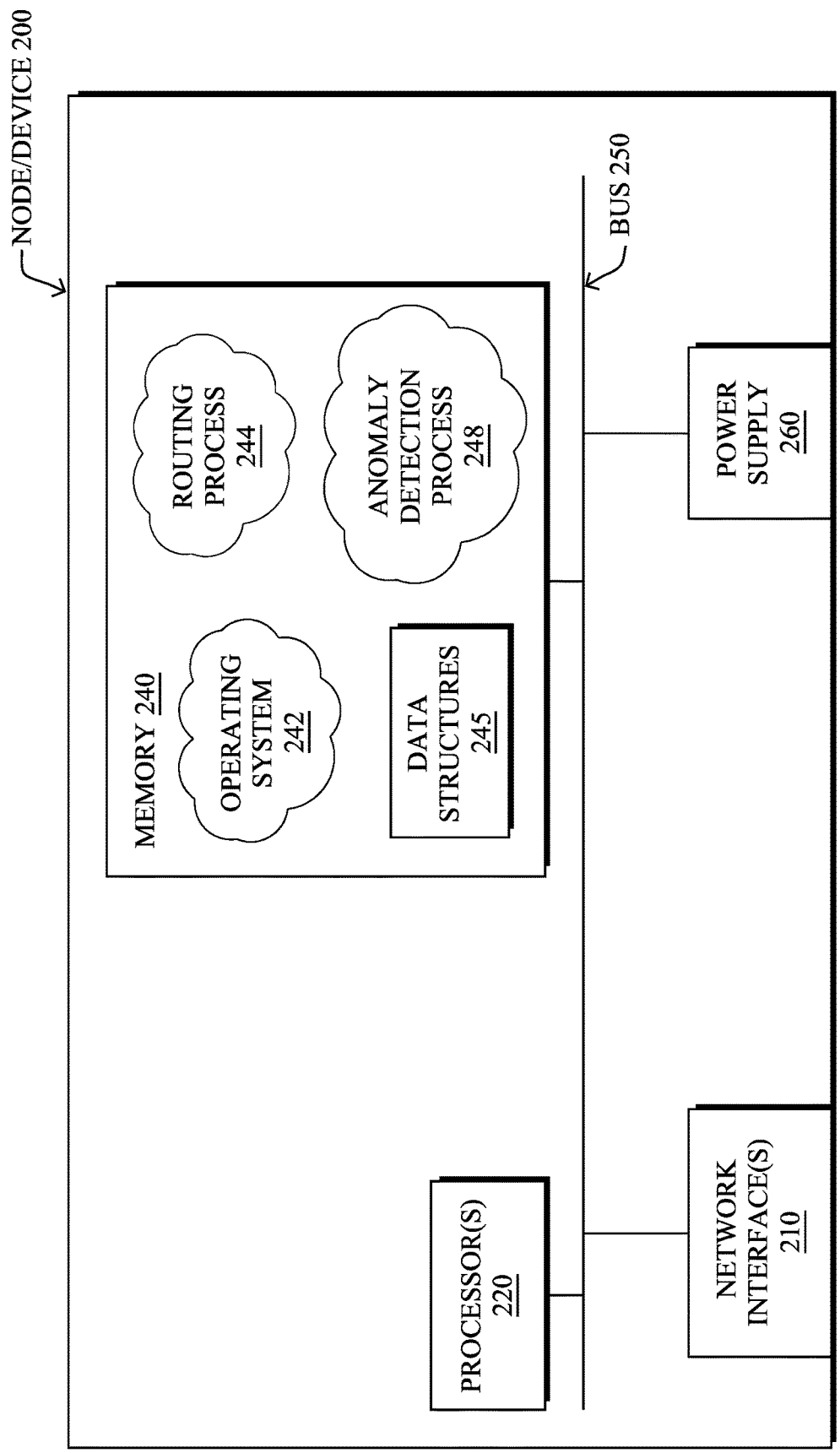
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a routing process 244 and/or an anomaly detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Anomaly detection process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Anomaly detection process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. anomaly detection process 248 may advantageously identify these forms of misconfigurations, in order to be detected and fixed.

In various embodiments, anomaly detection process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, anomaly detection process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

As noted above, the IoT represents an evolution of computer networks that is driving an exponential growth in the number and types of devices that are on a computer network. Consequently, the number and types of network anomalies that may result are also ever-increasing. Traditionally, network anomaly detection has been focused on temporal changes in the operational characteristics of the compute network, such as by detecting outliers from time series of measurements. For example, assume that there is typically a low amount of traffic volume in the computer network at 2:00 AM. In such a case, a large spike in the traffic volume at this time of day can be flagged as anomalous, based on the prior time series of traffic volumes. Of course, more complex anomaly detection approaches may take into account any number of different measurements, rather than a single metric.

Spatio-Temporal Anomaly Detection in Computer Networks Using Graph Convolutional Recurrent Neural Networks (GCRNNs)

The techniques herein introduce an anomaly detection approach for computer networks that looks not only to the temporal aspects of the collected sensor data from the network, but also takes into account the spatial properties of the network. In some aspects, an anomaly detector can be constructed on top of a graph convolutional neural network and convolutional long short-term memory recurrent neural network (LSTM) models.

Specifically, according to one or more embodiments of the disclosure as described in detail below, a device receives sensor data from a plurality of nodes in a computer network. The device uses the sensor data and a graph that represents a topology of the nodes in the network as input to a graph convolutional neural network. The device provides an output of the graph convolutional neural network as input to a convolutional long short-term memory recurrent neural network. The device detects an anomaly in the computer network by comparing a reconstruction error associated with an output of the convolutional long short-term memory recurrent neural network to a defined threshold. The device initiates a mitigation action in the computer network for the detected anomaly.

Illustratively, the techniques described herein may be performed by hardware, software, and/or firmware, such as in accordance with the anomaly detection process 248, which may include computer executable instructions executed by the processor 220 (or independent processor of interfaces 210) to perform functions relating to the techniques described herein, e.g., in conjunction with routing process 244.

Figure 3A:
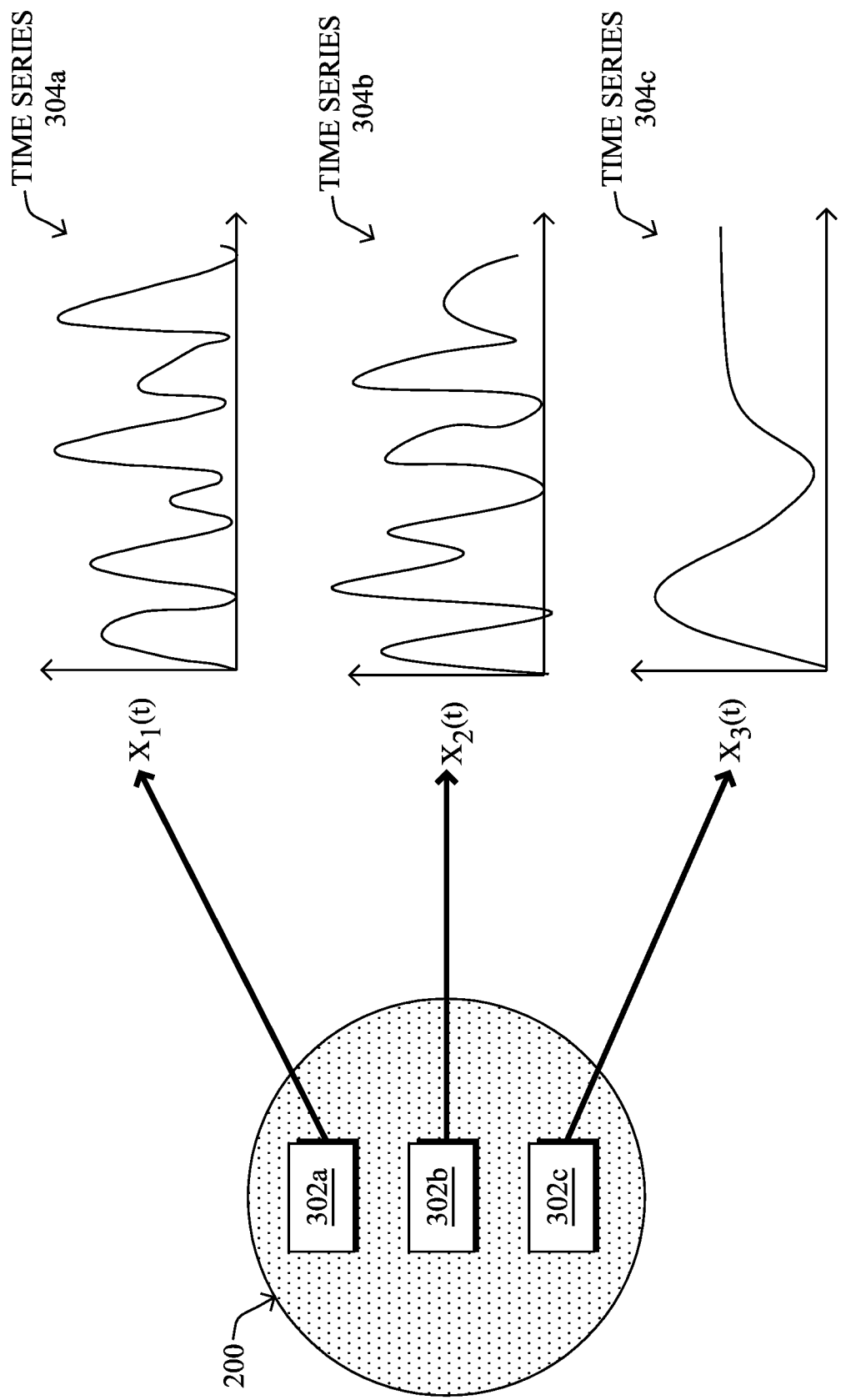
FIGS. 3A-3B illustrate examples of network devices/nodes generating sensor data.
Figure 3B:
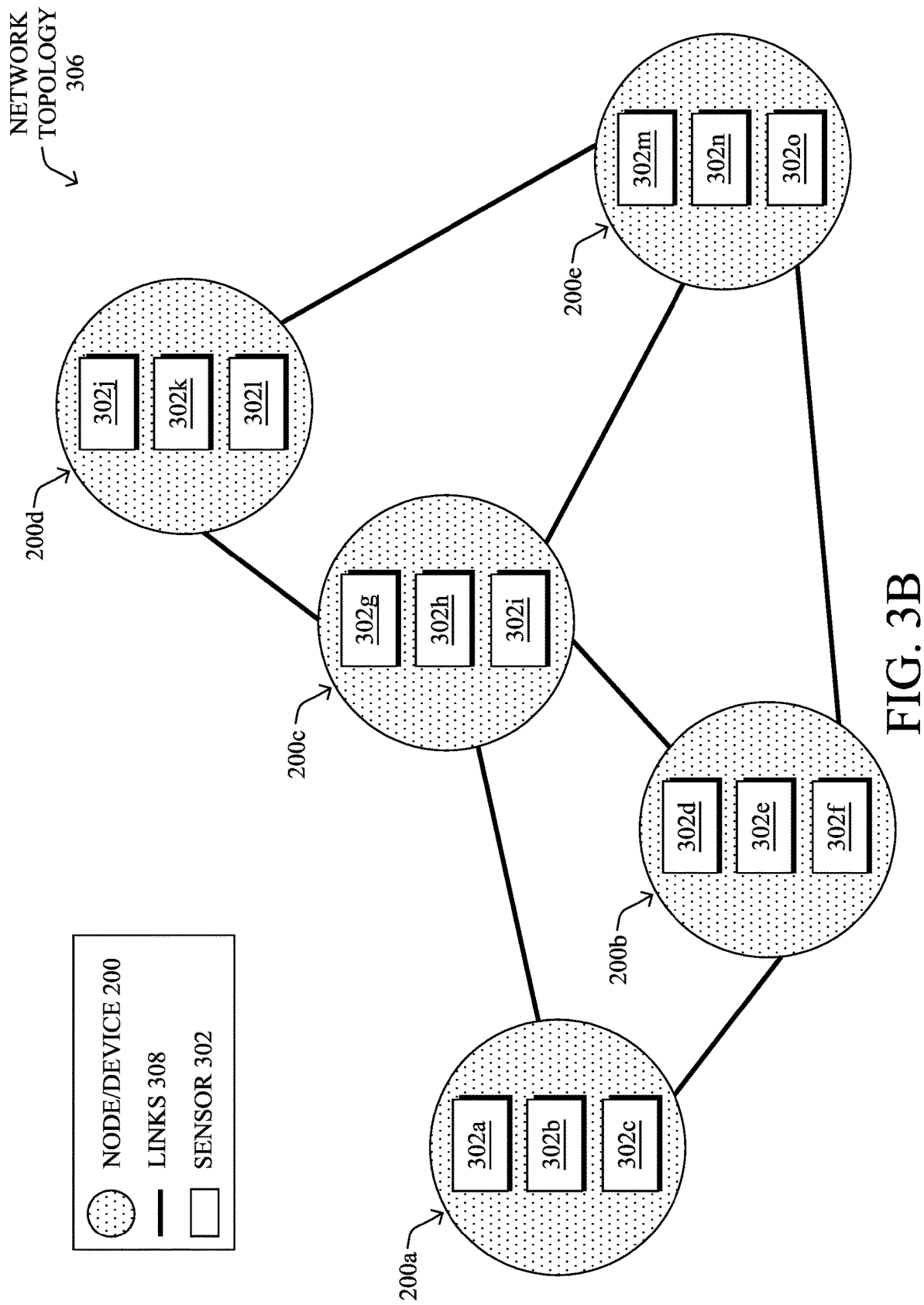

Operationally, FIG. 3A-3B illustrate examples example of network devices/nodes generating sensor data, according to various embodiments. As shown in FIG. 3A, a given device/node 200 in a computer network may include any number of sensors 302 that generate sensor data. For example, as shown, node 200 may include sensors 302a-302c that each capture different sensor measurements. As used herein, a "sensor" may be any form of software or hardware of node 200 configured to measure one or more operational characteristics of node 200. For example, a sensor 302 may capture operational characteristics of node 200 such as, but not limited to, resource availability and/or consumption information (e.g., available memory, CPU usage, etc.), environmental measurements (e.g., temperature, humidity, etc.), traffic information (e.g., packet sizes, timing information, traffic types, jitter, etc.), network link information (e.g., packet drops, signal strength, etc.), and the like. In many cases, this sensor information may be stored in one or more log files either locally on node 200 or provided to a central repository for further analysis.

Over time, the sensor readings from each of sensors 302 of node 200 may be used to construct a corresponding time series 304 of the sensor data. For example, readings $x_1(t)$ from sensor 302a may be used to construct time series 304a. Similarly, readings $x_2(t)$ from sensor 302b may be used to construct time series 304b and readings $x_3(t)$ from sensor 302c may be used to construct time series 304c. Each of these time series 304 may be used, in some embodiments, for purposes of anomaly detection in the computer network. For example, time series 304a can be used to define an upper bound threshold for $x_1(t)$ that, if crossed, may denote the presence of an anomaly in the computer network. More advanced anomaly detectors may take a multi-dimensional approach and may assess time series 304a-304c collectively.

While temporal-only anomaly detection can be effective in some situations, IoT devices, in particular, tend to be grouped in proximity of one another at a physical location and interact with one another. For example, consider the simplified case of FIG. 3B in which devices/nodes 200a-200e are connected by network links 308 (e.g., wireless links, PLC links, etc.), thereby allowing devices/nodes 200a-200e to communicate with one another, such as part of an LLN or other form of computer network, as part of a network topology 306.

Each of nodes 200a-200e may include any number of sensors 304 that generate sensor data. For example, assume that node 200a is the same node 200 as described previously in FIG. 3A with sensors 304a-304c. Similarly, node 200b may include sensors 304d-304f, node 200c may include sensors 304g-304i, node 200d may include sensors 304j-304l, and node 200e may include sensors 304m-304o. As would be appreciated, the sensors 304 shown are for illustrative purposes only and a given node 200 may include any number of sensors 304 that generate sensor data.

Here, not only are nodes 200 generating sensor data that can be assessed for temporal changes, in order to detect anomalies in the computer network, but there also exists a spatial relationship between the nodes and their associated sensor data. Such a spatial relationship can be identified through analysis of network topology 306, which is known. For example, consider the case of a water pressure/quality measurement system in which IoT devices are located at several places along the path of water flow. In such a case, the combination of two sensor measurements (e.g., pressure) from different locations can result in an abnormal event. This particular type of anomaly cannot be detected by looking at only the temporal aspects of the sensor data. Thus, some forms of anomalies may have spatial aspects, as well as temporal aspects.

Figure 4:
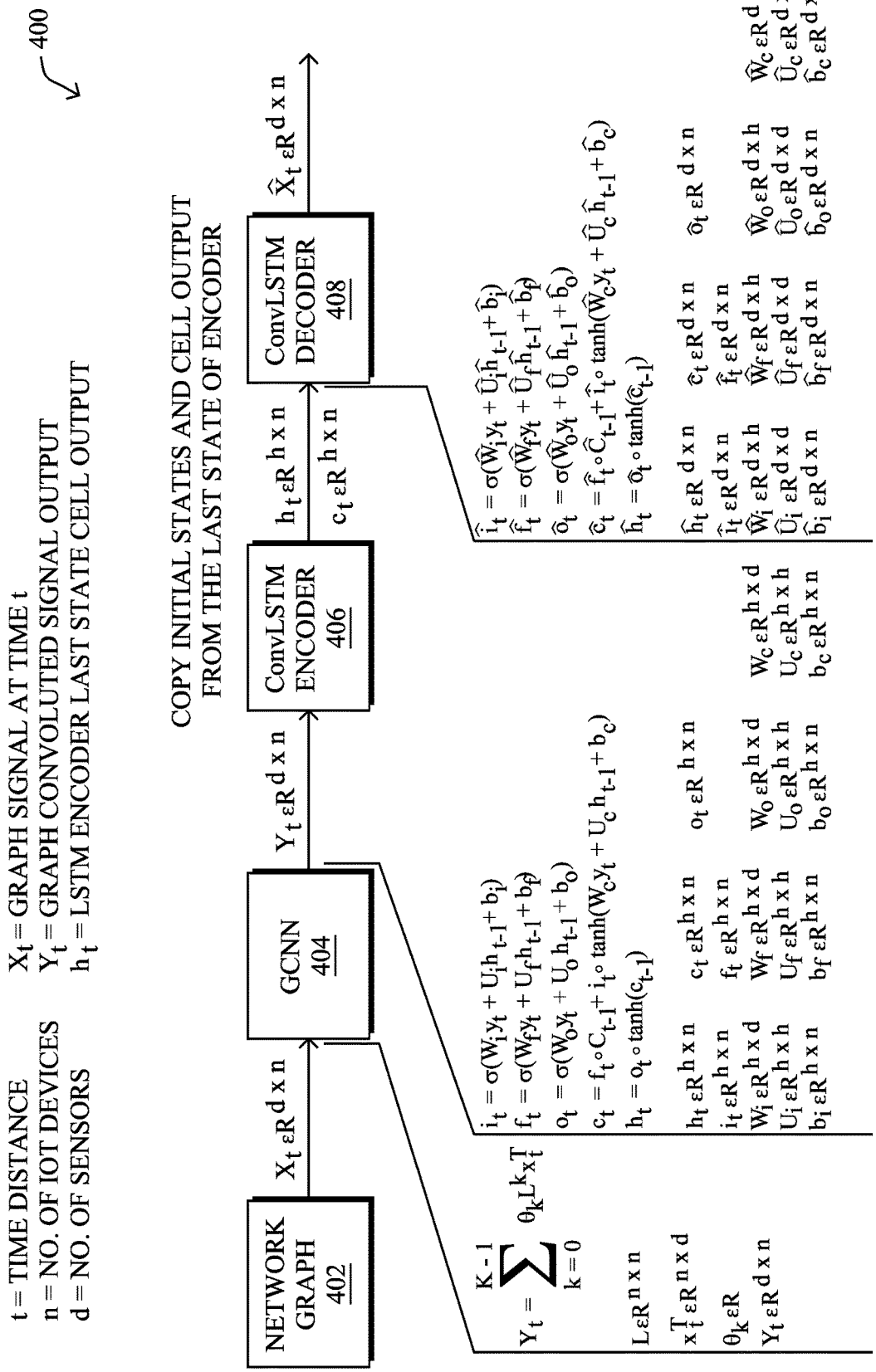
FIG. 4 illustrates an example architecture for performing anomaly detection in a computer network.

According to various embodiments, the techniques herein introduce an anomaly detection mechanism for a computer network that takes into account both spatial and temporal aspects. FIG. 4 illustrates an example architecture 400 for performing such anomaly detection in a computer network. As shown, architecture 400 may be implemented by an anomaly detection process, such as anomaly detection process 248, as executed by a device/node 200 in the network. The executing device may perform its analysis on its own local sensor data and/or sensor data received from one or more other nodes in the computer network.

In various embodiments, the device implementing architecture 400 may generate a network graph 402 of the portion of the computer network undergoing anomaly detection. Such a network graph 402 may be formed based on the network topology, which can be determined by the executing device from signaling from the routing protocol. For purposes of notation, let graph $G=(V,E)$ be the underlying computer network topology where V is set of nodes representing the devices/nodes in the computer network and E is the set of graph edges that represent the dependency links between these devices.

In various embodiments, an anomaly detector can be constructed on top of a graph convolutional neural network (GCNN) 404 and a convolutional long short-term memory (LSTM) recurrent neural network (ConvLSTM) that comprises an encoder layer 406 and a decoder layer 408. In doing so, the anomaly detector can take into account not only the temporal aspects of the assessed sensor data, but also the spatial aspects of the sensors.

In general, GCNNs are a relatively recent attempt to apply neural networks to arbitrarily structured graphs, such as convolution neural networks (CNNs). For example, the goal of a GCNN may be to learn a function of the features/signals on the graph G=(V,E) noted above, which takes as input the feature description $x_t$ for every node in the graph. The input $x_t$ at time t can be represented in $R^{d*n}$ as a d×n feature matrix, where d is the number of sensors and n is the number of nodes/devices in the computer network undergoing the anomaly detection. The graph structure can also be represented in matrix form, typically as an adjacency matrix A. The graph Laplacian can also be expressed as L=D−A, where D is the degree matrix and A is the adjacency matrix, which may be weighted or directed.

As shown, $x_t$ is the signal from graph 402 at time t that is provided to GCNN 404 as input. Typically, $x_t$ is a matrix of the sensor data from all of the d-number of sensors on the n-number of nodes/devices in the computer network undergoing anomaly detection by the device implementing architecture 400. Every neural network layer of GCNN 404 may be a non-linear function, with $x_t$ being the input for the first layer and $y_t$ being the final output of GCNN 404, which may also be an n×d matrix. As would be appreciated, GCNN 404 exploits the spatial dependencies of the sensors in the computer network.

In various embodiments, GCNN 404 may be stacked on top of a ConvLSTM which comprises encoder and decoder layers 406 and 408, respectively. In general, convolutional LSTM recurrent neural networks are generalizations of LSTM models built to exploit temporal dependencies and generalizing learning from a sequence of vectors to a sequence of graphs. Together, GCNN 404 and the ConvLSTM can be also be referred to as a graph convolutional recurrent neural network models (GCRNN). Thus, during operation, the full GCRNN shown may exploit both the temporal and spatial dependencies of the sensor data.

Traditionally, ConvLSTMs have been used image analysis and represent LSTMs as a specialized RNN with a memory cell $c_t$ that acts as an accumulator for the state information. When new input is received, $c_t$ may accumulate the state information based on whether its input gate $i_t$ is active. If the "forget" gate $f_t$ is active, the past cell state $c_{t-1}$ can also be forgotten. Propagation of the latest cell $c_t$ to the final state $h_t$ is also controlled by an output gate $o_t$. By controlling the flow of data using the memory cell and various gates, the gradient is trapped in $c_t$.

In various embodiments, ConvLSTM encoder 406 may be constructed using the following custom formulations:

$$i_t = \sigma(W_i y_t + U_i h_{t-1} + b_i)$$

$$f_t = \sigma(W_f y_t + U_f h_{t-1} + b_f)$$

$$o_t = \sigma(W_o y_t + U_o h_{t-1} + b_o)$$

-continued $$c_t = f_t \circ c_{t-1} + i_t \circ \tanh(W_c y_t + U_c h_{t-1} + b_c)$$

$$h_t = o_t \circ \tanh(c_{t-1})$$

where "∘" is the Hadamard product.

Similarly, in further embodiments, decoder 408 may be constructed using the following custom formulations:

$$\hat{i}_t = \sigma(\hat{W}_i h_t + \hat{U}_i \hat{h}_{t-1} + \hat{b}_i)$$

$$\hat{f}_t = \sigma(\hat{W}_f h_t + \hat{U}_f \hat{h}_{t-1} + \hat{b}_f)$$

$$\hat{o}_t = \sigma(\hat{W}_o h_t + \hat{U}_o \hat{h}_{t-1} + \hat{b}_o)$$

$$\hat{c}_t = \hat{f}_t \circ \hat{c}_{t-1} \circ \tanh(\hat{W}_c z_t + \hat{U}_c \hat{h}_{t-1} + \hat{b}_c)$$

$$\hat{h}_t = \hat{o}_t \circ \tanh(\hat{c}_{t-1})$$

Note that the constructed ConvLSTM, which differs from standard LSTM models, is designed to preserve the spatial dependency from GCNN 404, while exploiting the temporal behavior of the data. Together, these models learn the normal behavior of an IOT network through the encoding and decoding phases.

Training of the overall GCRNN model can be achieved by taking a chunk of sequences (e.g., m-number of sequences) of sensor data of length L from the network operating under normal behavior. In other words, a time series of length L of sensor data from the network can be used to train the models shown, to learn the normal behavior of the computer network. End to end training of the GCRNN can be achieved using back propagation, in some embodiments.

According to various embodiments, the device implementing architecture 400 may detect an anomaly by checking the reconstruction error of the GCRNN against a defined threshold for a given input $x_t$. For example, such an error can be computed from $\hat{x}_t$, the output of the ConvLSTM model. In some embodiments, the anomaly threshold may be set manually based on input from a user interface. In other embodiments, the anomaly threshold may be set based on a percentage deviation from the 'normal' behavior.

When the device implementing architecture 400 detects an anomaly in the computer network, it may initiate any number of mitigation actions. For example, the device may cause traffic in the computer network to be blocked or dropped (e.g., if the traffic is suspected of being associated with malware). In another example, the device may cause one or more of the devices/nodes in the computer network to be removed from the routing topology (e.g., in the case of a malfunctioning node). In a further embodiment, the device may send an alert regarding the detected anomaly to a user interface.

Figure 5:
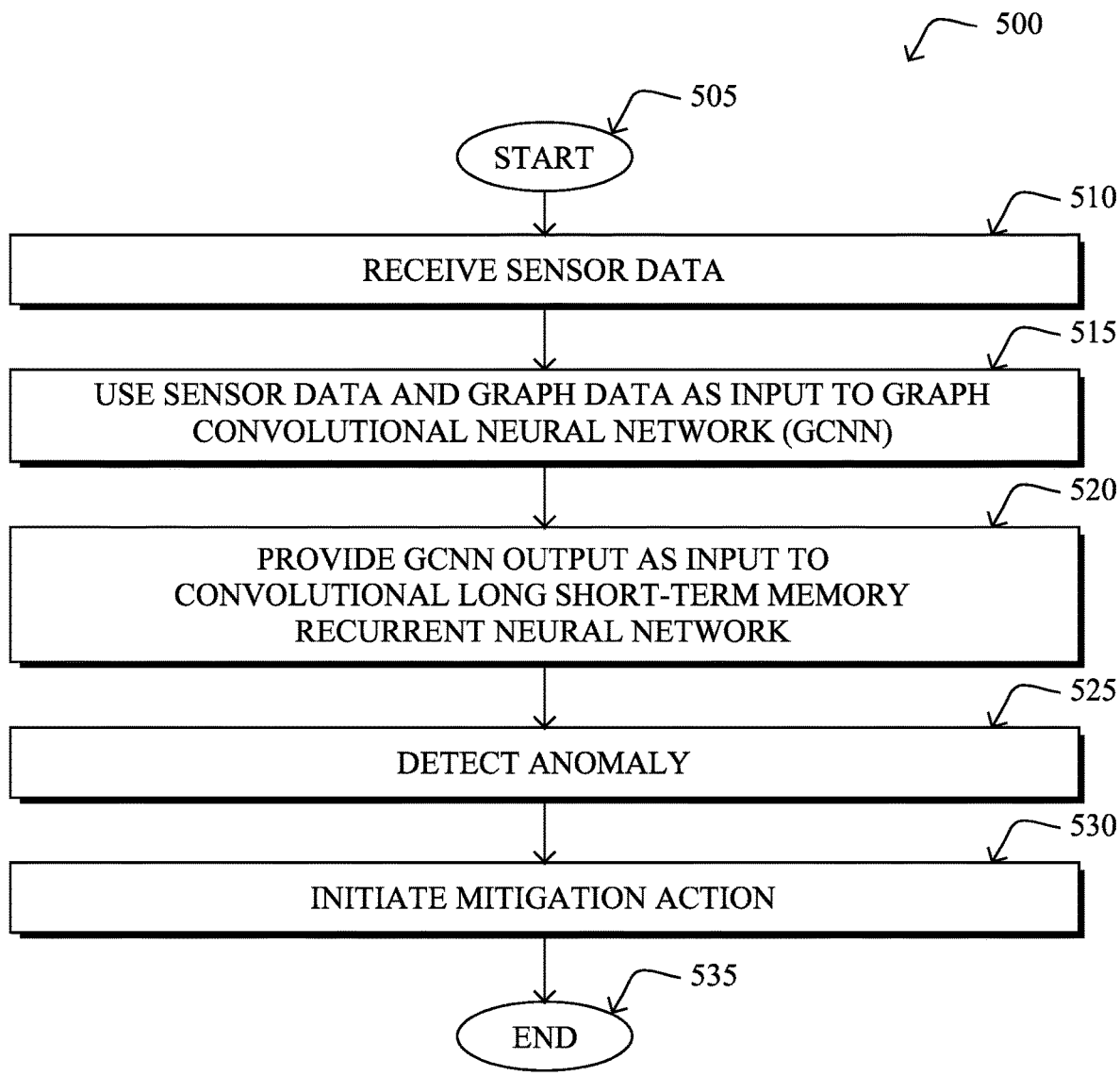
FIG. 5 illustrates an example simplified procedure for performing anomaly detection in a computer network.

FIG. 5 illustrates an example simplified procedure for detecting an anomaly in a computer network, in accordance with one or more embodiments described herein. For example, a non-generic, specifically configured device (e.g., device 200) may perform procedure 400 by executing stored instructions (e.g., process 248). The procedure 500 may start at step 505, and continues to step 510, where, as described in greater detail above, the device may receive sensor data from a plurality of nodes in a computer network. Each node may include any number of "sensors" that generate the sensor data. For example, a given node/device in the computer network may capture log data over time indicative of the operational characteristics of the node.

At step 515, as detailed above, the device may use the sensor data and a graph that represents a topology of the nodes in the network as input to a graph convolutional neural network (GCNN). Notably, the device may form a graph with vertices that represent the various nodes/devices in the computer network and edges that represent the links between these nodes/devices. In addition, in some embodiments, the sensor data from time t can be represented as a d×n matrix, where d is the number of sensors and n is the number of nodes/devices in the computer network.

At step 520, the device may provide an output of the graph convolutional neural network as input to a convolutional long short-term memory recurrent neural network, as described in greater detail above. Such a network may include encoder and decoder layers, as detailed above, that assess the temporal dependencies of the data.

At step 525, as detailed above, the device may detect an anomaly in the computer network by comparing a reconstruction error associated with an output of the convolutional long short-term memory recurrent neural network to a defined threshold. In some embodiments, the device may receive the threshold from a user interface, thereby allowing a network administrator to define the anomaly threshold for the anomaly detection system.

At step 530, the device may initiate a mitigation action in the computer network for the detected anomaly, as described in greater detail above. Such a mitigation action may comprise blocking or dropping traffic in the computer network, removing one or more of the nodes associated with the detected anomaly from the routing topology, or sending an alert regarding the detected anomaly to a user interface. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an anomaly detection mechanism for computer networks that take into account not only the temporal dependencies of the sensor data, but also their spatial dependencies.

While there have been shown and described illustrative embodiments that provide for anomaly detection in a network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, sensor data from a plurality of nodes in a computer network;
   using, by the device, the sensor data and a graph that represents a topology of the nodes in the network as input to a graph convolutional neural network;
   providing, by the device, an output of the graph convolutional neural network as input to a convolutional long short-term memory recurrent neural network, wherein the graph convolutional neural network is configured to produce its output based in part on a spatial dependency between the nodes in the computer network;
   detecting, by the device, an anomaly in the computer network by comparing a reconstruction error associated with an output of the convolutional long short-term memory recurrent neural network to a defined threshold, wherein the convolutional long short-term memory recurrent neural network is configured to produce its output based on a temporal dependency of the sensor data; and
   initiating, by the device, a mitigation action in the computer network for the detected anomaly.

2. The method as in claim 1, wherein the mitigation action comprises one of: blocking or dropping traffic in the computer network, removing one or more of the nodes associated with the detected anomaly from the routing topology, or sending an alert regarding the detected anomaly to a user interface.

3. The method as in claim 1, wherein the sensor data comprises log data from the plurality of nodes in the computer network regarding operational characteristics of the nodes.

4. The method as in claim 1, further comprising:
   receiving, at the device, the defined threshold from a user interface.

5. The method as in claim 1, further comprising:
   training the graph convolutional neural network and convolutional long short-term memory recurrent neural network using back propagation.

6. The method as in claim 5, wherein the training uses training data comprising time series of the sensor data indicative of normal operations of the computer network.

7. An apparatus, comprising:
   one or more network interfaces to communicate with a computer network;
   a processor coupled to the network interfaces and configured to execute one or more processes; and
   a memory configured to store a process executable by the processor, the process when executed configured to:
   receive sensor data from a plurality of nodes in a computer network;
   use the sensor data and a graph that represents a topology of the nodes in the network as input to a graph convolutional neural network;
   provide an output of the graph convolutional neural network as input to a convolutional long short-term memory recurrent neural network, wherein the graph convolutional neural network is configured to produce its output based in part on a spatial dependency between the nodes in the computer network;
   detect an anomaly in the computer network by comparing a reconstruction error associated with an output of the convolutional long short-term memory recurrent neural network to a defined threshold, wherein the convolutional long short-term memory recurrent neural network is configured to produce its output based on a temporal dependency of the sensor data; and
  initiate a mitigation action in the computer network for the detected anomaly.

8. The apparatus as in claim 7, wherein the mitigation action comprises one of: blocking or dropping traffic in the computer network, removing one or more of the nodes associated with the detected anomaly from the routing topology, or sending an alert regarding the detected anomaly to a user interface.

9. The apparatus as in claim 7, wherein the sensor data comprises log data from the plurality of nodes in the computer network regarding operational characteristics of the nodes.

10. The apparatus as in claim 7, wherein the process when executed is further configured to:
  receive the defined threshold from a user interface.

11. The apparatus as in claim 7, wherein the process when executed is further configured to:
  train the graph convolutional neural network and convolutional long short-term memory recurrent neural network using back propagation.

12. The apparatus as in claim 11, wherein the training uses training data comprising time series of the sensor data indicative of normal operations of the computer network.

13. A tangible, non-transitory, computer-readable medium storing program instructions that cause a processor of a device to execute a process comprising:
  receiving, at the device, sensor data from a plurality of nodes in a computer network;
  using, by the device, the sensor data and a graph that represents a topology of the nodes in the network as input to a graph convolutional neural network;
  providing, by the device, an output of the graph convolutional neural network as input to a convolutional long short-term memory recurrent neural network, wherein the graph convolutional neural network is configured to produce its output based in part on a spatial dependency between the nodes in the computer network;
  detecting, by the device, an anomaly in the computer network by comparing a reconstruction error associated with an output of the convolutional long short-term memory recurrent neural network to a defined threshold, wherein the convolutional long short-term memory recurrent neural network is configured to produce its output based on a temporal dependency of the sensor data; and
  initiating, by the device, a mitigation action in the computer network for the detected anomaly.

14. The computer-readable medium as in claim 13, wherein the mitigation action comprises one of: blocking or dropping traffic in the computer network, removing one or more of the nodes associated with the detected anomaly from the routing topology, or sending an alert regarding the detected anomaly to a user interface.

15. The computer-readable medium as in claim 13, wherein the sensor data comprises log data from the plurality of nodes in the computer network regarding operational characteristics of the nodes.

16. The computer-readable medium as in claim 13, wherein the process further comprises:
  receiving, at the device, the defined threshold from a user interface.

17. The computer-readable medium as in claim 13, wherein the process further comprises:
  training the graph convolutional neural network and convolutional long short-term memory recurrent neural network using back propagation.

* * * * *